B. HOOVER.

SAFETY APPLIANCE FOR RAILROAD CARS.

APPLICATION FILED JAN. 19, 1916.

Reissued Mar. 28, 1916. 14,095.

Inventor:

Benjamin Hoover, by Spear, Middleton, Donaldson & Spear Atty's.

THE COLUMBIA PLANOGRAPH CO., WASHINGTON, D. C.

UNITED STATES PATENT OFFICE.

BENJAMIN HOOVER, OF MERIDIAN, MISSISSIPPI, ASSIGNOR TO QUEEN CITY SAFETY APPLIANCE COMPANY, OF MERIDIAN, MISSISSIPPI, A CORPORATION.

SAFETY APPLIANCE FOR RAILROAD-CARS.

14,095. Specification of Reissued Letters Patent. Reissued Mar. 28, 1916.

Original No. 1,134,335, dated April 6, 1915, Serial No. 871,325. Application for reissue filed January 19, 1916. Serial No. 73,056.

*To all whom it may concern:*

Be it known that I, BENJAMIN HOOVER, a citizen of the United States, residing at Meridian, in the county of Lauderdale and State of Mississippi, have invented a new and useful Safety Appliance for Railroad-Cars, of which the following is a specification.

The present invention appertains to an air brake applying device for railway cars, and is more particularly an improvement over the safety attachment for railway cars disclosed in my former Letters Patent No. 1,093,854, issued April 21, 1914.

This invention contemplates the provision of a safety attachment for railway cars, including a normally closed valve applicable to the air line or train pipe, and novel means for connecting the said valve with the truck, whereby an abnormal or excessive movement of the truck relative to the car body, such as occurs when the truck is derailed, will result in an opening of the valve to thereby release the air and to apply the automatic air brake for arresting or checking the movement of the train.

Another object of the invention, is to provide unique operating means for the valve, which will ordinarily permit of a limited oscillation of the car truck relative to the car body, as when rounding curves and the like, without the liability of accidentally opening the valve, and whereby an abnormal movement of the truck relative to the car body, will result in the opening of the valve for the intended purposes.

It is also within the scope of the invention, to provide an appliance of the nature indicated, which will be comparatively simple, non-encumbering and inexpensive in construction, which may be readily applied to railway cars now in use, and which will be simple, practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in its preferred embodiment in the accompanying drawing, wherein:—

Figure 1:
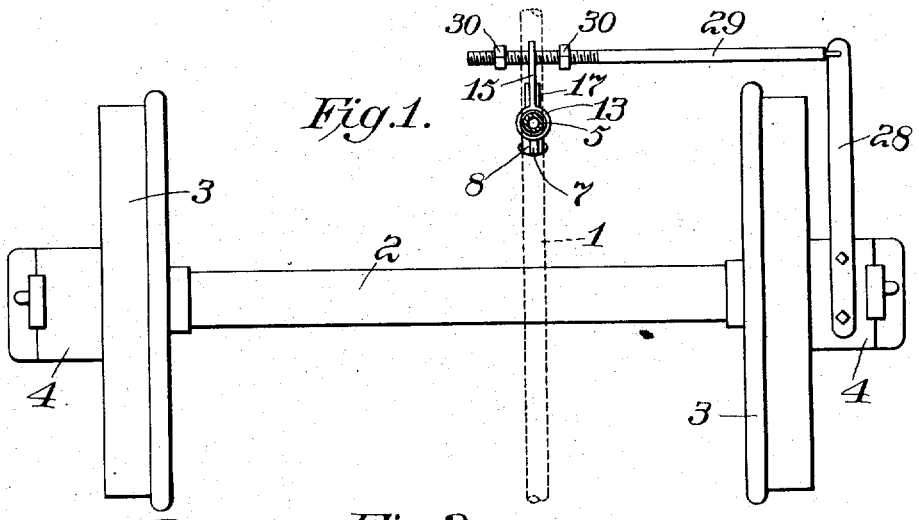
Figure 2:
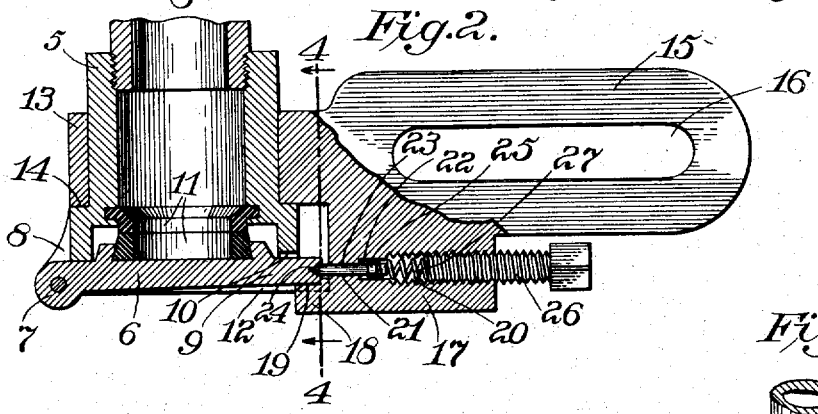
Figure 4:
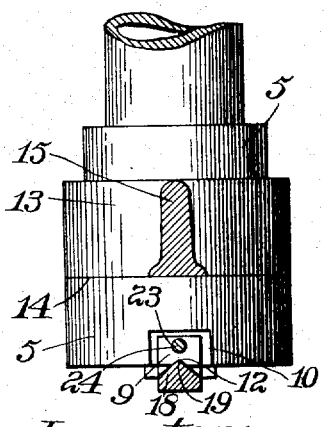
Figure 3:
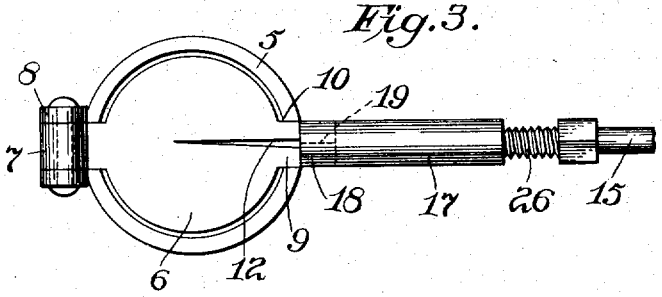

Figure 1 is a plan view of the appliance. Fig. 2 is an enlarged sectional view of the release valve structure. Fig. 3 is an enlarged bottom view of the valve structure. Fig. 4 is a sectional view taken on the line 4—4 of Fig. 2.

In the drawings, the numeral 1 designates the usual train pipe which extends along the bottom of the car body (not shown) and over the trucks. As illustrated in Fig. 1, only one pair of wheels of a truck is shown, the numeral 2 designating the axle, the numerals 3, the wheels secured thereon, and the numerals 4, the usual journal boxes for the ends of the axle and which are carried by the truck frame (not shown).

The present attachment embodies a release valve structure including an upright tubular casing or sleeve 5 having its upper end attached in any suitable manner to the train pipe 1, so that the valve casing depends therefrom adjacent the truck. A valve 6 is disposed within the lower end of the valve casing 5, and is provided with a lug 7 projecting from its periphery and pivoted within a notch 8 provided in the lower end of the casing 5. The valve 6 is also provided with a lug 9 projecting from its free portion, opposite the lug 7, and the lug 9 is normally received by a notch 10 provided in the lower end of the casing 5 opposite the notch 8. Coöperating gaskets 11 are carried by the casing and valve to contact with each other when the valve is closed, to seal the valve structure. It will be observed that these gaskets come in contact with each other and when the valve 6 is in its closed position the gaskets are under pressure to make a tight closure and at the same time put a pressure due to their compression upon the valve, and thus tends to prevent displacement of the valve. The bottom of the lug 9 has a groove or slot 12.

As a means for releasing or opening the valve 6, a ring 13 embraces the casing 5 and seats upon an annular shoulder 14 formed upon the casing, to enable the ring 13 to rotate. The ring 13 has a radial arm 15 projecting from one side and provided with a slot or opening 16. The arm 15 has a depending portion 17 which has a lower lug 18 arranged to move snugly under the valve lug 9 to hold the valve seated. The lug 18 has a sharp edge or rib 19 engageable in the groove 12 to hold the ring 13 against accidental rotation. The arm 15 projects horizontally and longitudinally, and is arranged to swing in a horizontal plane between the sides of the car. The portion 17 is also provided with a longitudinal bore 20 extending toward the lug 9 of the valve 6, and having that end adjacent the lug 9 reduced in diameter, as at 21, to provide an inner shoulder 22. A holding pin 23 is slidable through the reduced portion 21 of the bore 20, and is provided with a pointed tip to engage within a recess or notch 24 provided in the free end of the lug 9. The pin 23 is also provided with a collar or head 25 within the bore 20 to seat against the shoulder 22 for limiting the outward movement of the pin 23, an adjusting bolt 26 being threaded into the other end of the bore 20, and a coiled wire expansion spring 27 being disposed within the said bore between the adjusting bolt 26 and the collar or head 25 of the pin 23. Thus, the pin 23 is yieldably projected to engage the recess 24 of the lug 9, for holding the arm 15 at normal position, under ordinary circumstances, and in order that when the arm 15 is forcibly swung, the pin 23 will snap out of the recess 24 to release the arm 15 and allow the same to swing to one side or the other.

A bar or bracket 28 is bolted or otherwise secured upon one of the journal boxes 4, and projects longitudinally beyond the periphery of the adjacent wheel 3, and a transverse rod 29 is pivotally connected to the free end of the bracket 28 and slidably engages through the slot or opening 16 of the oscillatory arm 15. A pair of nuts or stop members 30 are threadedly or adjustably engaged upon the rod 29 at the opposite sides of the arm 15, whereby the nuts 30 may be adjusted to ordinarily enable the rod 29 to have limited reciprocatory movement relative to the arm 15, without oscillating the said arm. The bracket 28 and arm 15 project longitudinally in one direction from the journal box and valve structure, respectively, while the connecting rod 29 is disposed transversely to operatively connect the free ends of the bracket 28 and valve releasing arm 15.

In operation, the valve 6 is normally seated, to prevent the escape of the air, and is held seated by the detent lug 18 of the portion 17 carried by the arm 15. The ordinary relative movement between the truck and car body is permitted since the rod 29 has a limited sliding movement relative to the arm 15, it being noted that when the truck is oscillated relative to the car body, the bracket 28 will be swung horizontally to slide or reciprocate the rod 29 transversely through the slot 16 of the valve operating arm 15. However, should the truck become derailed, it will be swung or moved laterally to an abnormal or excessive degree, and this will result in one or the other of the nuts 30 contacting with the arm or lever 15, and swinging the same so that the lug 18 will move from under the lug 9 of the valve 6, and so that the pin 23 will also be released from the lug 9. As a result, the valve 6 will be released and opened, and the air will be permitted to escape, to set the automatic air brake and bring the train to a halt. The present device therefore arrests or checks the movement of the train, should the truck become derailed.

The other advantages and attributes of the present device will be obvious, it is thought, from the foregoing, taken in connection with the drawing, without further comment being necessary.

Having thus described the invention, what is claimed as new is:—

1. In a safety attachment of the character described, a valve structure attachable to a train pipe and including a releasable valve, a longitudinally projecting bracket attachable to a journal box to project beyond the adjacent wheel, and a transverse rod connected to the free end of the bracket and operatively connected to the said valve structure for releasing the valve.

2. In a safety attachment of the character described, a valve structure attachable to a train pipe and including a releasable valve, a longitudinally projecting bracket attachable to a journal box to project beyond the adjacent wheel, a transverse rod pivotally connected to the free end of the bracket, and means operatively connecting the said rod and valve structure for enabling the rod to have limited movement relative to the valve structure, and whereby the abnormal movement of the rod will release the valve.

3. In a safety attachment of the character described, a valve structure attachable to a train pipe and including a releasable valve, an oscillatory arm carried by the valve structure and arranged to release the valve, a longitudinally projecting bracket attachable to a journal box to project beyond the adjacent wheel, and a transverse rod pivotally engaged to the free end of the bracket and having a limited sliding movement relative to the said arm.

4. In a safety attachment of the character described, a valve structure attachable to a train pipe and including a releasable valve, an oscillatory arm carried by the valve structure and arranged to release the valve, a longitudinally projecting bracket attachable to a journal box to project beyond the adjacent wheel, a rod pivotally engaged to the free end of the bracket and slidably engaging the said arm, and adjustable members upon the said rod and engageable with the said arm upon the abnormal movement of the rod, to swing the arm.

5. In a safety attachment of the character described, a brake applying device, a longitudinally projecting bracket attachable to a journal box to project beyond the adjacent wheel, and means operatively connecting the free end of the bracket and the said device whereby an abnormal movement of the bracket will render the said device operative.

6. In a safety attachment of the character described, a brake applying device, a longitudinally projecting bracket attachable to a journal box to project beyond the adjacent wheel, and a transverse rod pivotally engaged to the free end of the bracket, the said rod having a limited movement relative to the said device and being arranged to render the said device operative upon an abnormal movement of the rod.

7. In a safety attachment of the character described, a brake applying device including an oscillatory arm for rendering the device operative, a longitudinally projecting bracket attachable to a journal box to project beyond the adjacent wheel, and a transverse rod pivotally engaged to the free end of the bracket and having a limited sliding engagement with the said arm.

8. In a safety attachment of the character described a valve structure embodying a casing and a normally seated releasable pivoted valve, and an oscillatory actuating arm having a ring embracing the casing, and a detent engageable with the free portion of the valve for normally holding the valve seated.

9. In a safety attachment of the character described, a valve structure embodying a casing and a normally seated releasable valve having a lug, and an actuating arm having a ring embracing the casing and a portion having a detent lug engageable with the lug of the valve to normally hold the valve seated.

10. In a safety attachment for railway cars, a brake controlling train pipe, a pivoted valve under spring tension closing the same, an oscillatory arm having means directly engaging the valve to hold it closed, the oscillation of said arm through abnormal movement of the train releasing the valve, substantially as described.

11. In a safety attachment for railway cars, a brake controlling train pipe, a valve pivoted thereto adapted to close the same, gaskets between the valve and the pipe end to make an air tight joint and compressible in closing the valve an oscillatory arm having means for positively engaging and holding the valve closed, said arm being displaceable under abnormal movement of the train to release the valve, substantially as described.

Dec. 21st, 1915.

BENJAMIN HOOVER.

Witnesses:
H. A. SHOTTS,
M. A. MCGREW.

Copies of this patent may be obtained for five cents each, by addressing the "Commissioner of Patents, Washington, D. C."